Figure 1:
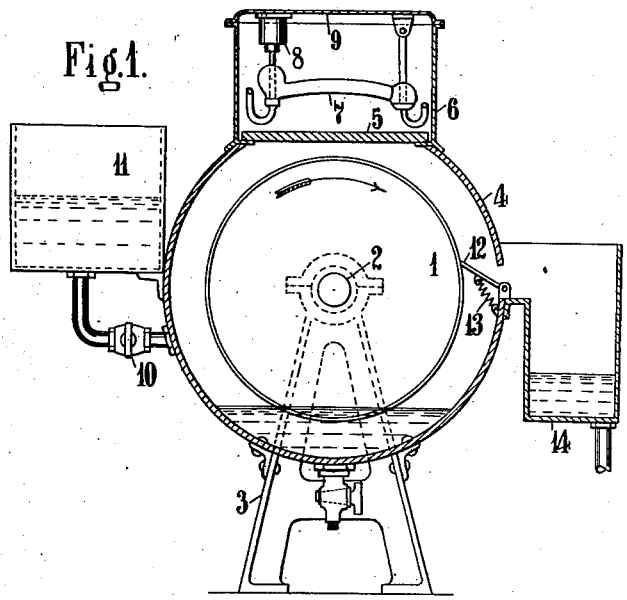

V. HENRI, A. HELBRONNER & M. VON RECKLINGHAUSEN.
APPARATUS FOR TREATING LIQUIDS BY MEANS OF ULTRA VIOLET RAYS.
APPLICATION FILED MAY 20, 1911.

1,068,898.

Patented July 29, 1913.
5 SHEETS—SHEET 1.

WITNESSES:

INVENTORS.

V. HENRI, A. HELBRONNER & M. VON RECKLINGHAUSEN.
APPARATUS FOR TREATING LIQUIDS BY MEANS OF ULTRA VIOLET RAYS.
APPLICATION FILED MAY 20, 1911.
1,068,898.
Patented July 29, 1913.
5 SHEETS—SHEET 2.
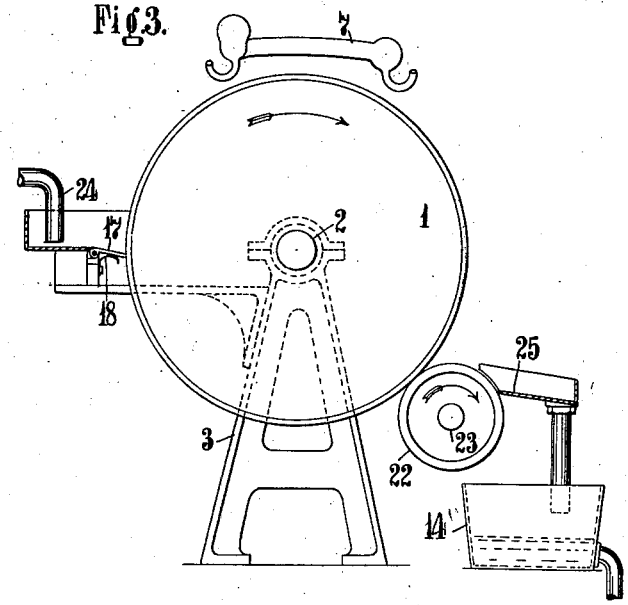
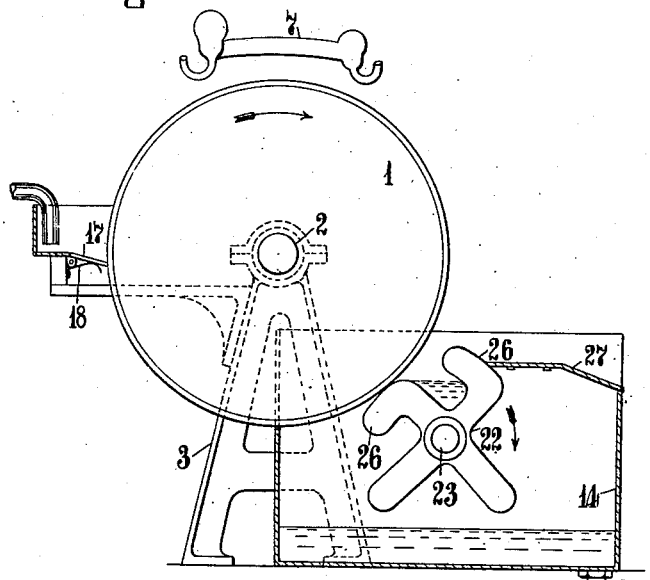

V. HENRI, A. HELBRONNER & M. VON RECKLINGHAUSEN.
APPARATUS FOR TREATING LIQUIDS BY MEANS OF ULTRA VIOLET RAYS.
APPLICATION FILED MAY 20, 1911.

1,068,898.

Patented July 29, 1913.

5 SHEETS—SHEET 3.

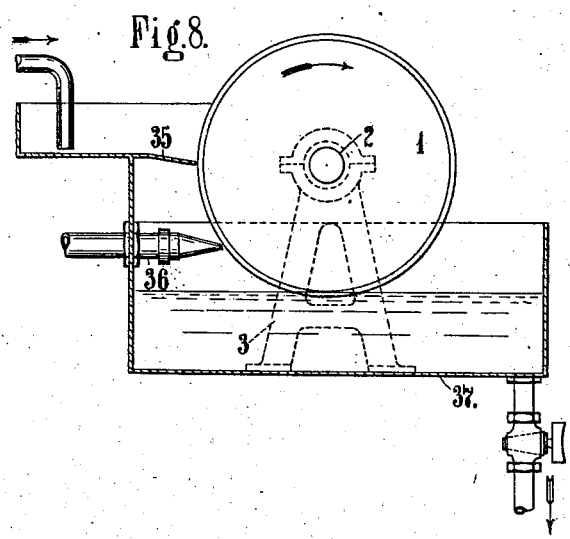
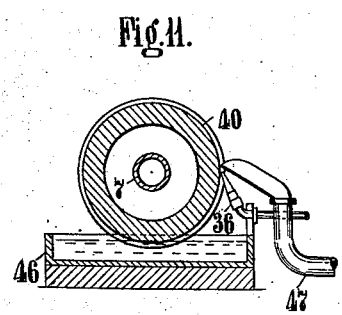
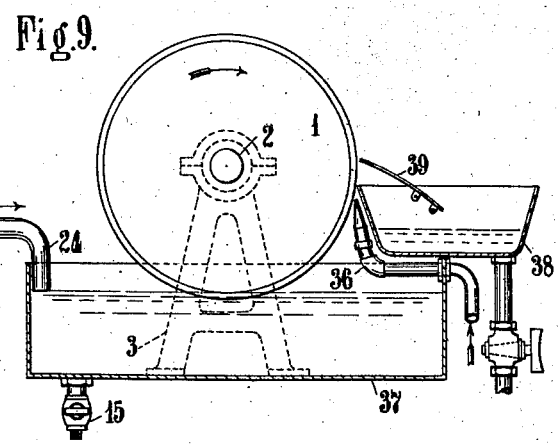

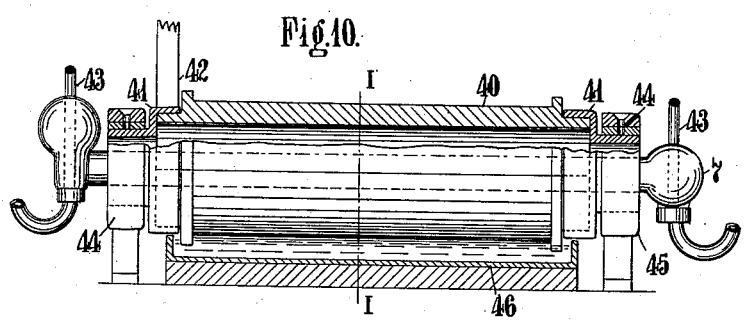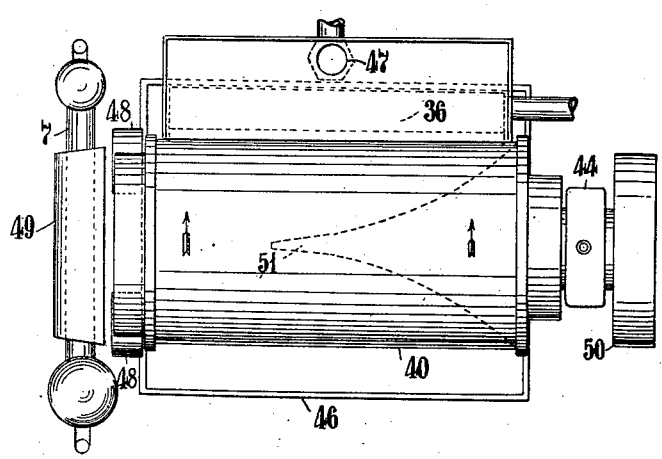

UNITED STATES PATENT OFFICE.

VICTOR HENRI, ANDRÉ HELBRONNER, AND MAX von RECKLINGHAUSEN, OF PARIS, FRANCE.

APPARATUS FOR TREATING LIQUIDS BY MEANS OF ULTRA-VIOLET RAYS.

1,068,898.      Specification of Letters Patent.      Patented July 29, 1913.

Application filed May 20, 1911. Serial No. 628,477.

*To all whom it may concern:*

Be it known that we, VICTOR HENRI and ANDRÉ HELBRONNER, citizens of the Republic of France, and MAX VON RECKLINGHAUSEN, a subject of the Emperor of Germany, residing at Paris, France, have invented new and useful Improvements in Apparatus for Treating Liquids by Means of Ultra-Violet Rays, of which the following is a specification.

This invention relates to the sterilization of liquids by means of ultra-violet rays and particularly such liquids as are somewhat opaque to the rays, and which in order to effect complete sterilization must be exposed in the form of a thin film.

In the specification of our patent application filed 7th June 1910 Serial No. 565610, we have described apparatus adapted to produce thin films of liquid which may be exposed to the ultra-violet rays emitted from a mercury vapor lamp or other suitable source. It has been found that many liquids such as milk do not under the action of gravity alone form sufficiently thin films to enable the liquid to be sterilized entirely and thoroughly, and means have therefore been provided for utilizing the forces due to surface tension and centrifugal force for securing a film of liquid sufficiently thin for the purpose. As an example of such apparatus we described systems of rollers or cylinders by means of which the milk is taken up in the form of a very thin film and exposed to the action of the ultra-violet rays.

The present invention comprises certain improvements in apparatus of this type whereby it is made more suitable for the purpose in view and by means of which certain difficulties which have arisen in practice, particularly in connection with the sterilization of milk, may be avoided.

It is generally desirable to conduct the sterilizing operation in a closed apparatus in order to prevent infected air from contaminating the liquid which is being sterilized. In this closed apparatus a vacuum may be created, or it may be filled with sterilized air or other gases. For instance, the apparatus may be filled with nitrogen or carbonic acid whereby the formation of ozone and action thereof on the liquid is prevented. In some cases it may be desirable to sterilize liquids under a pressure which is greater than that of the atmosphere. These objects can be achieved by inclosing the rotating cylinder in a circular casing and mounting the lamp in a chamber at the top of the casing provided with a window at the bottom constructed of quartz or other material which is permeable to the ultra-violet rays. The rays emitted by the lamp pass through the window into the casing and act upon the liquid upon the periphery of the roller as it passes underneath the window. For removing the liquid after sterilization a scraper is employed which is pressed into contact with the roller by means of a spring or other suitable device. The liquid is collected in the lower part of the casing and can be led away through a suitable delivery pipe. The apparatus can also be arranged so that the liquid is picked up from the bottom of the casing and after being sterilized is collected on a scraper on the side of the roller which is descending and delivered to a receptacle at the side.

In sterilizing milk by means of the apparatus described in the specification of our previous patent above mentioned we have found that there is a tendency for particles of butter to be formed where friction is produced, for example where the collecting scraper is in contact with the roller. These particles of butter soon cover the surface of the roller and prevent a good working of the process, and we therefore provide means for removing the butter in order to avoid this drawback. A method of accomplishing this object is to provide a smaller roller rotating in contact with the main roller but in the opposite direction. This roller takes up the butter from the main roller and delivers it to a scraper which is maintained in contact with the former.

In a modification of the apparatus the liquid and butter are collected from the main roller by means of a roller of star-shaped cross section constructed preferably of rubber. The axis of the star-shaped rubber roller is located parallel with the axis of the main roller and is mounted sufficiently near to the main roller so that the arms of the star are bent over when in contact with the main roller on account of their resiliency. The butter is taken off the main roller by means of these resilient arms and the liquid is collected in the recesses between the arms. The collector delivers up the butter to a scraper pressed in contact with the same and delivers the liquid into a suitably arranged receptacle.

Another method for removing particles of butter from the main roller comprises an endless rubber band which is operated parallel to the axis of the main roller. This band may be provided with raised portions or ridges arranged across the same which scrape the butter from the periphery of the main roller but allow the greater part of the liquid to drip from the belt into a suitably arranged trough below.

The apparatus may also be arranged so that the butter which collects on a scraper in contact with the rotating cylinder is periodically removed by the operation of an intermittent siphon in the receptacle where the liquid is collected. The periodical and sudden removal of the liquid by means of the siphon washes the particles of butter off the scraper at regular intervals during the sterilizing operation.

The apparatus may also be constructed so that the trough or plate which delivers the milk to the rotating cylinder does not make contact with the same and the speed of rotation may be arranged so that there is no dripping of liquid between the small air-gap where the plate approaches the cylinder. The collecting scraper is not in contact with the roller so that no butter is formed. In order to insure that all the milk runs on to this scraper an air-blast is suitably directed so as to take off the whole film of milk. The jet of air, is, however, so directed and regulated that no particles of the milk are lost.

The rotating cylinders may also be constructed of material such as quartz which is permeable to ultra-violet rays. For instance, a hollow cylinder may be constructed by securing together two split cylinder portions of quartz by means of collars at the ends. This cylinder is supported on suitable bearings and arranged to be rotated, a vapor electric lamp capable of emitting ultra-violet rays being located longitudinally inside said cylinder. The cylinder is arranged to take up a thin film of liquid when it is rotated, and any of the hereinbefore described devices may be used for forming such a thin film of liquid on the surface of the cylinder and for collecting the same after it has been exposed to the ultra-violet rays.

Instead of supporting the lamp inside the rotating cylinder it may also be conveniently supported at the open end and the rays directed with the aid of a reflector toward the inside of the cylinder. An additional reflector of suitable shape is mounted inside the cylinder so that the ultra-violet rays are reflected toward the internal periphery of the same, and the film of liquid on the external periphery will be exposed to the action of the rays. If desired, quartz cylinders of this type may be inclosed in hermetically sealed outer casings as hereinbefore described.

Figure 2:
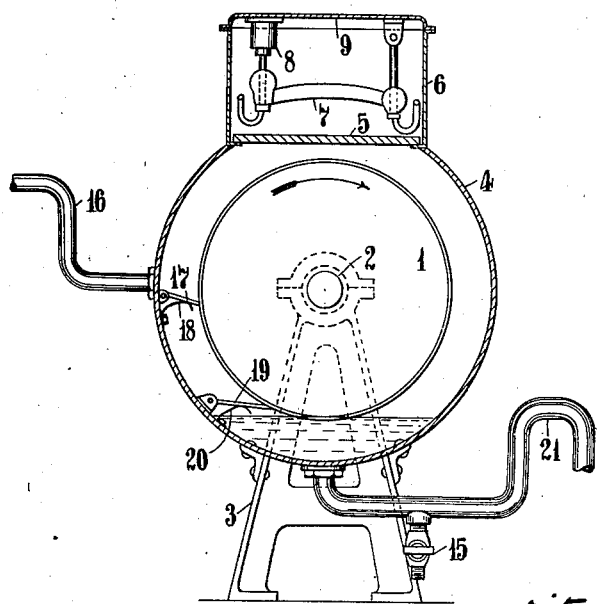
Figure 5:
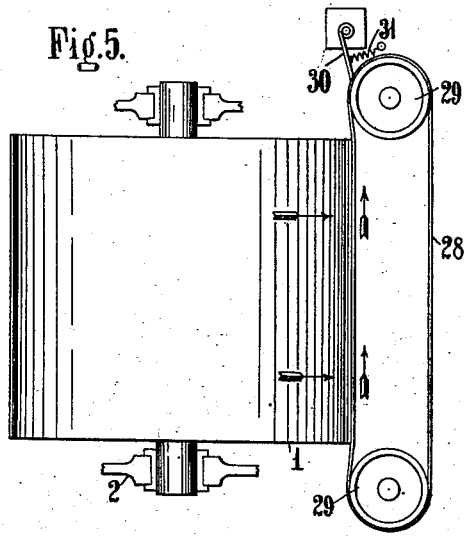

In the accompanying drawings several forms of construction of the apparatus in accordance with the present invention are shown by way of example, Figure 1 being a vertical section of the rotating cylinder inclosed in a casing with the lamp mounted in a chamber at the top. Fig. 2 shows a modification also in vertical section showing an alternative method of removing the liquid after sterilization. Fig. 3 shows in vertical section the arrangement of a collecting roller in the apparatus whereby butter may be removed, Fig. 4 being a modification in which the collecting roller is of star shaped cross section. Fig. 5 shows in plan view the arrangement of the endless belt which is operated parallel to the axis of the roller, Fig. 6 being a side view of a modification which is provided with raised portions acting as scrapers. Fig. 7 shows in vertical section the construction of the apparatus in order that the scraper may be periodically washed by the operation of an intermittent siphon and Figs. 8 and 9 show different methods of utilizing an air-blast for blowing the liquid off the surface of the roller. Fig. 10 shows in a vertical view partly sectional the arrangement of a hollow cylinder constructed of material permeable to ultra-violet rays, Fig. 11 being a transverse section on the line I—I of Fig. 10. Fig. 12 shows the arrangement of the lamp at the open end of the cylinder with suitably arranged reflectors for directing the ultra-violet rays toward the periphery of the cylinder.

Referring now to Fig. 1 the roller or cylinder 1 is supported in a suitable bearing 2 on a frame 3. Surrounding the roller is a cylinder or casing 4 provided at the top with a window 5 constructed of quartz or other material which is permeable to ultra-violet rays. The chamber 6 is arranged above the window and a lamp 7 capable of emitting ultra-violet rays supported therein. The lamp shown in the drawings is a mercury vapor lamp provided with a quartz container and it is provided with an electromagnetically-operated tilting device 8 supported on the cover 9 of the chamber. The roller 1 is adapted to be rotated in the casing 4 and liquid is admitted through the inlet cock 10 from the reservoir 11 and collects in the lower part of the cylindrical casing 4 so that the roller dips therein. The roller as it is rotated in the direction shown by the arrow takes up a thin film of liquid and it is exposed to the ultra violet rays which pass through the window 5. After treatment the liquid is collected on the scraper 12 which is held in contact with the roller by means of the spring 13, and is collected in the receptacle 14. A drain cock 15 is provided in the lower part of the cylindrical casing in order to remove liquid therefrom when the apparatus is not in use. If it is desired to create a vacuum in the apparatus it is necessary to provide the receptacle 14 with a hermetically sealed cover.

In the form of apparatus shown in Fig. 2 the liquid is admitted into the cylindrical casing by means of the inlet pipe 16 whence it enters on a plate 17 which is kept in contact with the roller by means of the spring 18. The liquid is carried forward in the form of a thin film from the plate 17 when the roller is rotated in the direction shown by the arrow and is collected on the lower part of the cylindrical casing by means of the collecting scraper 19 which is held in contact with the roller by means of a spring 20. The liquid passes away by the delivery pipe 21, a drain cock 15 being arranged in the same for the purpose of removing the liquid when the apparatus is not in use.

The forms of apparatus shown in Figs. 1 and 2 are not very suitable for sterilizing milk because butter is liable to be formed on the scrapers, but in the case of Fig. 2 particles of butter formed on the scraper 19 are washed away by the liquid collected in the lower part of the cylindrical casing. If desired a vacuum may be created in the lamp chamber 6 in order to avoid absorption of the ultra-violet rays.

In the remaining figures apparatus which is particularly adapted for sterilizing milk is shown. In the form of construction shown in Fig. 3 a collecting roller 22 made of or coated with rubber or other suitable material is supported so that it can rotate in contact with the main roller 1. The roller 22 rotates on its axle 23 in the opposite direction to the main roller 1 and collects the milk and particles of butter which are formed on the main roller. The liquid is admitted by the inlet 24 and is brought on to the roller by means of the plate 17 which is kept in contact with the periphery of the roller by means of the spring 18. The lamp 7 is supported above the top of the roller and acts upon the film of milk or other liquid which is spread on the periphery. The collecting roller 22 delivers the milk to the scraper 25 which also takes off any particles of butter which may have been formed. The sterilized liquid is finally delivered to the receptacle 14.

In the form of construction shown in Fig. 4 the collecting roller 22 is made of flexible material such as india rubber in the form of a star and is mounted on its axle 23 so that the arms 26 bend over on account of their resiliency when in contact with the main roller 1. The liquid is delivered in the same manner as shown in Fig. 3 and is collected in the recesses between adjacent arms 26 of the collecting roller 22; the particles of butter are collected on the projecting arms of the star and delivered to the scraper 27 while the liquid in the recesses of the star is delivered to the receptacle for sterilized liquid 14.

In the form of construction shown in Fig. 5 an endless belt 28 is arranged to rotate on pulleys 29 so that the belt travels across the periphery of the roller, parallel with the axis of the latter. Particles of butter are collected on the endless belt and delivered to the scraper 30, provided with a spring 31 in order to retain it in contact with the endless belt.

Figure 6:
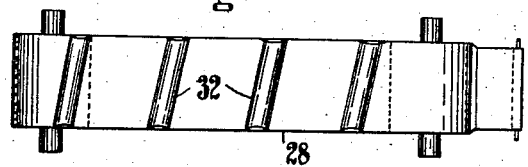
Figure 7:
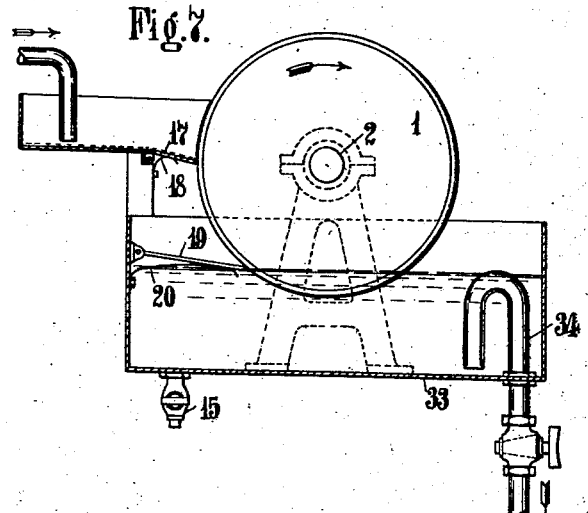

In the modification shown in Fig. 6 the endless belt 28 is provided with raised portions 32 which scrape the particles of butter from the periphery of the roller while the milk which is being sterilized runs down between the raised portions and may be collected in a receptacle at the bottom of the roller by means of a suitably arranged scraper.

In the modification shown in Fig. 7, the milk which is delivered to the roller on the plate 17 is collected in a receptacle 33 by means of the scraper 19. The particles of butter which are formed on the scraper 19 are removed by the rapid emptying of the receptacle 33 by means of the intermittent siphon 34. The scraper 19 in this form of construction should be arranged so that it is just below the level of the liquid in the receptacle when this is above the top of the siphon 34 and it is periodically washed by the operation of the siphon. A drain cock 15 is provided to empty the receptacle completely of liquid when the apparatus is not in use.

In the form of construction shown in Fig. 8, the liquid is admitted on the plate 35 and after being sterilized is blown off the roller by means of an air jet 36. The nozzle 36 is provided with an orifice in the form of a slot corresponding with the width of the roller and blows off the film of milk so that it is collected in the receptacle 37. A small air-gap is arranged between the plate 35 and the roller 1, and the speed of rotation of the roller is arranged so as to prevent liquid from dropping through the air gap. Since there are no scrapers in contact with the roller particles of butter are not formed.

In the modification shown in Fig. 9 the liquid is taken up from the receptacle 37 on the roller, and after being sterilized is taken off the roller by means of the sterilized air jet 36 which is arranged below the edge of the collecting receptacle 38. A screen 39 is arranged above the nozzle in order to collect any particles of milk which may be projected by the air jet owing to its being too powerful.

In the form of construction shown in Fig. 10 the roller 40 is constructed of a material such as quartz which is permeable to ultra-violet rays. The roller may be composed of two half cylinders secured together at the ends by means of collars 41, and driven by a belt 42 as shown. The lamp 7 is in this case supported in the inside of the hollow cylinder, and is provided with supports 43 at each end by means of which it may be tilted in order to set it in operation. The cylinder is rotated in the bearings 44 which are supported on the stand 45 and when rotated it takes up liquid from the receptacle 46. As the cylinder is rotated the film of liquid on the outer periphery is exposed to the ultra-violet rays emitted from the lamp 7 and after exposure it is collected by means of the air jet device shown in Fig. 11. The jet of air is blown through the nozzle 36 and the film of liquid is taken off the cylinder and carried away through the delivery pipe 47.

In the form of construction shown in Fig. 12 the hollow cylinder is supported in a fixed bearing 44 at one end and at the other end on two wheels 48. The lamp 7 is arranged at the open end of the hollow cylinder and is provided with a reflector 49 by means of which the ultra-violet rays emitted by the lamp are directed toward the inside of the cylinder. A reflector 51 is also mounted in the inside of the cylinder and is of such a shape that it reflects the rays received from the lamp 7 and reflector 49 toward the periphery of the cylinder 40. The cylinder is rotated by means of a pulley wheel 50 and when rotated takes up liquid from the receptacle 46. The film of liquid after exposure to the rays is collected by means of the air jet device 36 which takes off the film of liquid from the cylinder.

When the apparatus is inclosed in an outer casing in the manner illustrated in Figs. 1 and 2 it is necessary to provide inlets and outlets for air or other gases with which the apparatus is filled and each outlet should be plugged with cotton wool or other filtering material in order to prevent entrance of unfiltered air.

It should be understood that when the rotating cylinders are constructed from pieces of quartz care should be taken to make hermetically tight joints where the pieces are fitted together in order to prevent the air surrounding the lamp or any other air from coming into contact with and contaminating the liquid which is being sterilized.

It will be obvious that the forms of apparatus shown are only illustrative and that modifications may be made therein without exceeding the scope of the invention.

What we claim is:—

1. The combination of a rotary cylinder, means for supplying liquid to the periphery of said cylinder, means for exposing said film to the action of ultra-violet rays, a scraper and an air jet for driving the liquid from the cylinder on to said scraper.

2. The combination of a rotary hollow cylinder of material permeable to ultra-violet rays, an air tight casing inclosing same, means for supplying liquid to be treated to the periphery of said cylinder, means for causing ultra-violet rays to pass from the interior of the cylinder to the outside thereof, and means for collecting the treated liquid.

3. The combination of a rotary hollow cylinder formed of a plurality of pieces of material permeable to ultra-violet rays, means for supplying liquid to be treated to the periphery of said cylinder, means for causing ultra-violet rays to pass from the interior of the cylinder to the outside and means for collecting the treated liquid.

4. The combination of a rotary hollow cylinder of quartz, means for supplying liquid to be treated to the periphery of said cylinder, means for causing ultra-violet rays to pass from the interior of the cylinder to the outside and means for collecting the treated liquid.

5. The combination of a rotary hollow cylinder of material permeable to ultra-violet rays, means for supplying liquid to be treated to the periphery of said cylinder, means for causing ultra-violet rays to pass from the interior of the cylinder to the outside, a scraper and an air jet for driving liquid from the periphery of the cylinder on to the scraper.

6. The combination of a hollow cylinder of material permeable to ultra-violet rays adapted to be rotated on a horizontal axis, a trough for containing the liquid to be treated beneath the surface of which the lower part of said cylinder is immersed, means for causing ultra-violet rays to pass from the interior of the cylinder to the outside thereof and means for collecting the treated liquid.

7. The combination of a rotary hollow cylinder of material permeable to ultra-violet rays, means for supplying liquid to be treated to the periphery of said cylinder, a source of ultra-violet rays located within said cylinder and means for collecting the treated liquid from the periphery of the cylinder.

8. The combination of a rotary hollow cylinder of material permeable to ultra-violet rays, means for supplying liquid to be treated to the periphery of said cylinder, a source of ultra-violet rays located adjacent said cylinder and means for collecting the treated liquid from the periphery of the cylinder.

In testimony whereof we have hereunto subscribed our names this 10th day of October 1910.

VICTOR HENRI.
ANDRÉ HELBRONNER.
MAX von RECKLINGHAUSEN.

Witnesses:
H. C. COXE,
JOHN BAKER.